(12) United States Patent
Satoh

(10) Patent No.: US 9,982,943 B2
(45) Date of Patent: May 29, 2018

(54) CONTINUOUS HEATING FURNACE

(71) Applicant: IHI Corporation, Tokyo (JP)

(72) Inventor: Kimiyoshi Satoh, Tokyo (JP)

(73) Assignee: IHI CORPORATION (JP)

( * ) Notice: Subject to any disclaimer, the term of this patent is extended or adjusted under 35 U.S.C. 154(b) by 0 days. days.

(21) Appl. No.: 14/867,370

(22) Filed: Sep. 28, 2015

(65) Prior Publication Data

US 2016/0018161 A1 Jan. 21, 2016

Related U.S. Application Data

(63) Continuation of application No. PCT/JP2014/059611, filed on Apr. 1, 2014.

(30) Foreign Application Priority Data

Apr. 1, 2013 (JP) .................................. 2013-075985

(51) Int. Cl.
F27B 9/24 (2006.01)
F27B 9/06 (2006.01)
(Continued)

(52) U.S. Cl.
CPC ................ F27B 9/068 (2013.01); A21B 1/14 (2013.01); F27B 9/20 (2013.01); F27B 9/24 (2013.01);
(Continued)

(58) Field of Classification Search
CPC ...... F27B 9/24; F27B 9/36; F27B 9/40; F27D 17/00; A61B 1/14
(Continued)

(56) References Cited

U.S. PATENT DOCUMENTS 3,048,383 A * 8/1962 Champlin ................ C21D 9/63
266/111
4,449,923 A * 5/1984 Shimosato ........... C21D 9/0062
165/104.34
(Continued)

FOREIGN PATENT DOCUMENTS

CN 101118114 A 2/2008
CN 202092456 U 12/2011
(Continued)

OTHER PUBLICATIONS

International Search Report and Written Opinion mailed Jun. 3, 2014 in corresponding PCT International Application No. PCT/JP2014/059611.

*Primary Examiner* — Gregory A Wilson
(74) *Attorney, Agent, or Firm* — Ostrolenk Faber LLP

(57) ABSTRACT

A continuous heating furnace includes a furnace main body, a conveyance unit configured to convey a baking object W in the furnace main body, a plurality of heating sections heated by combustion, each having a first radiation surface configured to be heated by combustion and transfers heat to the baking object conveyed by the conveyance unit and arranged in the conveyance direction of the baking object in the furnace main body, and a cooling preheater having a second radiation surface configured to receive radiant heat from the baking object when being opposite to the baking object conveyed by the conveyance unit and a gas flow path configured to preheat a gas used for combustion in the heating section by the heat from the second radiation surface.

8 Claims, 9 Drawing Sheets

(51) Int. Cl.
*A21B 1/14* (2006.01)
*F27B 9/20* (2006.01)
*F27B 9/36* (2006.01)
*F27D 17/00* (2006.01)
*F27D 99/00* (2010.01)

(52) U.S. Cl.
CPC ............... *F27B 9/243* (2013.01); *F27B 9/36* (2013.01); *F27D 17/00* (2013.01); *F27D 2099/0045* (2013.01); *Y02P 60/83* (2015.11)

(58) Field of Classification Search
USPC .......... 432/48, 128, 152, 121, 147; 392/416, 392/417, 418
See application file for complete search history.

(56) References Cited

U.S. PATENT DOCUMENTS

| | | | | |
|---|---|---|---|---|
| 4,493,308 A | | 1/1985 | Hurley | 126/41 R |
| 4,790,749 A | | 12/1988 | Mauro | 432/59 |
| 5,070,625 A | * | 12/1991 | Urquhart | F26B 3/283 |
| | | | | 34/268 |
| 5,172,849 A | * | 12/1992 | Barten | B23K 1/008 |
| | | | | 228/18 |
| 5,906,485 A | | 5/1999 | Groff | 432/121 |
| 6,394,796 B1 | * | 5/2002 | Smith | F26B 3/283 |
| | | | | 432/19 |
| 7,514,650 B2 | * | 4/2009 | Melgaard | F27B 9/02 |
| | | | | 219/388 |
| 7,875,236 B2 | * | 1/2011 | Bleifuss | C21B 11/00 |
| | | | | 266/178 |
| 8,367,978 B2 | * | 2/2013 | Williams | F26B 3/283 |
| | | | | 219/388 |
| 8,513,572 B2 | * | 8/2013 | Schumacher | F26B 25/009 |
| | | | | 219/388 |
| 8,989,565 B2 | * | 3/2015 | Hayashi | F27B 9/021 |
| | | | | 392/416 |
| 8,997,374 B2 | * | 4/2015 | Sato | F26B 3/283 |
| | | | | 118/642 |
| 2004/0177769 A1 | | 9/2004 | Kobayashi | 99/360 |
| 2010/0267188 A1 | * | 10/2010 | Parks | F27B 9/20 |
| | | | | 438/87 |
| 2011/0139140 A1 | | 6/2011 | Baker | 126/1 AD |
| 2015/0377553 A1 | * | 12/2015 | Satoh | F23C 3/00 |
| | | | | 432/147 |

FOREIGN PATENT DOCUMENTS

| | | | | |
|---|---|---|---|---|
| CN | 102997654 A | | 3/2013 | |
| EP | 2966390 A1 | | 1/2016 | |
| JP | 58-117758 | | 8/1983 | |
| JP | 59-018376 | | 1/1984 | |
| JP | 62-015234 | | 4/1987 | |
| JP | 3053262 | | 10/1998 | |
| JP | 11-36015 | | 2/1999 | |
| JP | 2003-262473 | | 9/2003 | |
| JP | 2010-164269 | | 7/2010 | |
| JP | 4890655 | | 3/2012 | |
| JP | 2012-247103 | | 12/2012 | |
| JP | 2013-053811 | | 3/2013 | |
| JP | 2013053811 A | * | 3/2013 | ............... F27B 9/08 |
| WO | WO 2014/136938 A1 | | 9/2014 | |

* cited by examiner

DOWNSTREAM ⇔ UPSTREAM

CONTINUOUS HEATING FURNACE

This application is a continuation application based on a PCT Patent Application No.PCT/JP2014/059611, filed on Apr. 1, 2014, whose priority is claimed on Japanese Patent Application No. 2013-75985, filed on Apr. 1, 2013. The contents of both the PCT Application and the Japanese Application are incorporated herein by reference.

TECHNICAL FIELD

The present disclosure relates to a continuous heating furnace configured to combust fuel and heat a baking object.

BACKGROUND ART

In the related art, continuous heating furnaces configured to heat a radiator using combustion heat obtained by combusting a fuel gas, and heat conveyed baking objects such as industrial materials, foods, or the like using radiant heat from a radiation surface of the radiator are common. For example, in the continuous heating furnace that performs baking of rice crackers, a plurality of heating furnaces are continuously installed at intervals in a conveyance direction, rice crackers sequentially pass through the inside and the outside of the heating furnace, and thus baking and cooling of the rice crackers are alternately repeated. In this way, heat is transferred to the inside of the rice crackers without excessive burning of the surfaces of the rice crackers (for example, see Patent Document 1).

In addition, a technology of a continuous heating furnace in which both of a heating region in which burners are arranged and a cooling region in which heat transfer pipe for cooling are arranged are installed in the furnace is disclosed (for example, see Patent Document 2). In this technology, an exhaust gas ejected from the burners collides with the baking objects in the furnace to heat the baking objects, and a flow of the exhaust gas from the heating region (a slow cooling region) to the cooling region is suppressed by a partition wall. The air before supply into the burners flows through the heat transfer pipes, and the air flowing through the heat transfer pipes is preheated by heat of the atmosphere of the cooling region while cooling the atmosphere in the cooling region by the heat transfer pipes.

CITATION LIST

Patent Documents

[Patent Document 1] Japanese Patent Registration No. 4890655
[Patent Document 2] Japanese Unexamined Utility Model Application, First Publication No. S62-15234

SUMMARY OF DISCLOSURE

Technical Problem

In the case of the continuous heating furnace disclosed in Patent Document 1, heat loss according to cooling of the baking objects outside the furnace may occur. Meanwhile, according to the continuous heating furnace disclosed in Patent Document 2, since the heat radiated upon cooling is used to preheat the air supplied into the burners, thermal efficiency is increased. However, even when the partition wall is installed, in order to enable the baking objects to continuously pass through the cooling region, the cooling region cannot be closed. As a result, the temperature of the atmosphere in the cooling region is increased by convection from the heating region side, and it is difficult to sufficiently cool the baking objects.

In consideration of the above-mentioned circumstances, the present disclosure is directed to provide a continuous heating furnace capable of achieving both of sufficient cooling performance and high thermal efficiency by performing heating and cooling of baking objects.

Solution to Problem

In order to solve the problems, a continuous heating furnace of the present disclosure includes a furnace main body; a conveyance unit configured to convey a baking object in the furnace main body; a plurality of heating sections, each having a first radiation surface configured to be heated by combustion and transfers radiant heat to the baking object conveyed by the conveyance unit, and arranged in a conveyance direction of the baking object in the furnace main body; and a cooling preheater having a second radiation surface configured to receive radiant heat from the baking object when being opposite to the baking object conveyed by the conveyance unit, and a gas flow path configured to preheat a gas used for combustion in the heating section by heat from the second radiation surface.

The first radiation surface and the second radiation surface may be disposed to adjoin in the conveyance direction of the baking object. In addition, the continuous heating furnace may further include shielding sections positioned between the first radiation surface and the second radiation surface in the conveyance direction, extending closer to the baking object than the first radiation surface and the second radiation surface in a direction perpendicular to the conveyance direction, and having surfaces perpendicular to or inclined with respect to at least one of the first radiation surface and the second radiation surface.

The first radiation surface and the second radiation surface may be disposed to adjoin in the conveyance direction of the baking object, and the adjoining first radiation surface and second radiation surface may be inclined with respect to the conveyance direction such that one end sides adjacent to each other of both ends in the conveyance direction are disposed closer to the conveyance unit than the other end sides.

The continuous heating furnace may further include a regulator configured to regulate a heat transfer amount by radiant heat from the surface of the baking object to the second radiation surface such that a surface temperature of the baking object is maintained at a central temperature of the baking object or more.

Advantageous Effects of Disclosure

According to the present disclosure, as heating and cooling of baking objects are performed, both sufficient cooling performance and high thermal efficiency can be achieved.

DESCRIPTION OF EMBODIMENT

Figure 1:
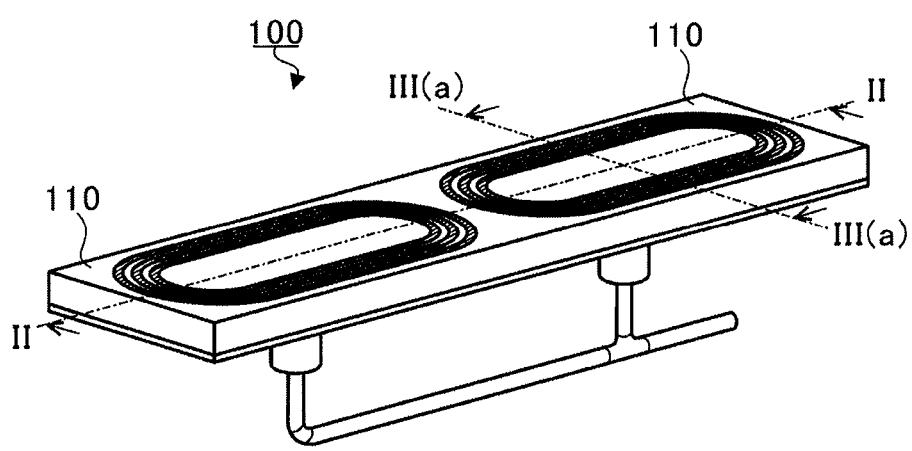
FIG. 1 is a perspective view showing an example of an appearance of a combustion heating system.

Hereinafter, an exemplary embodiment of the present disclosure will be described in detail with reference to the accompanying drawings. Dimensions, materials and other specific numerical values described in the embodiment are exemplarily provided for the purpose of easy understanding of the present disclosure, and the present disclosure is not limited thereto unless the context clearly indicates otherwise. Further, in the specification and the drawings, elements having substantially the same functions and configurations are designated by the same reference numerals, overlapping description thereof will be omitted, and elements not directly relating to the present disclosure will not be shown.

In a continuous heating furnace of the embodiment, a plurality of combustion heating systems are installed in a furnace. First, a combustion heating system disposed in the furnace will be described, and then the entire configuration of the continuous heating furnace will be described.

(Combustion Heating System 100 (Heating Section))

Figure 2:
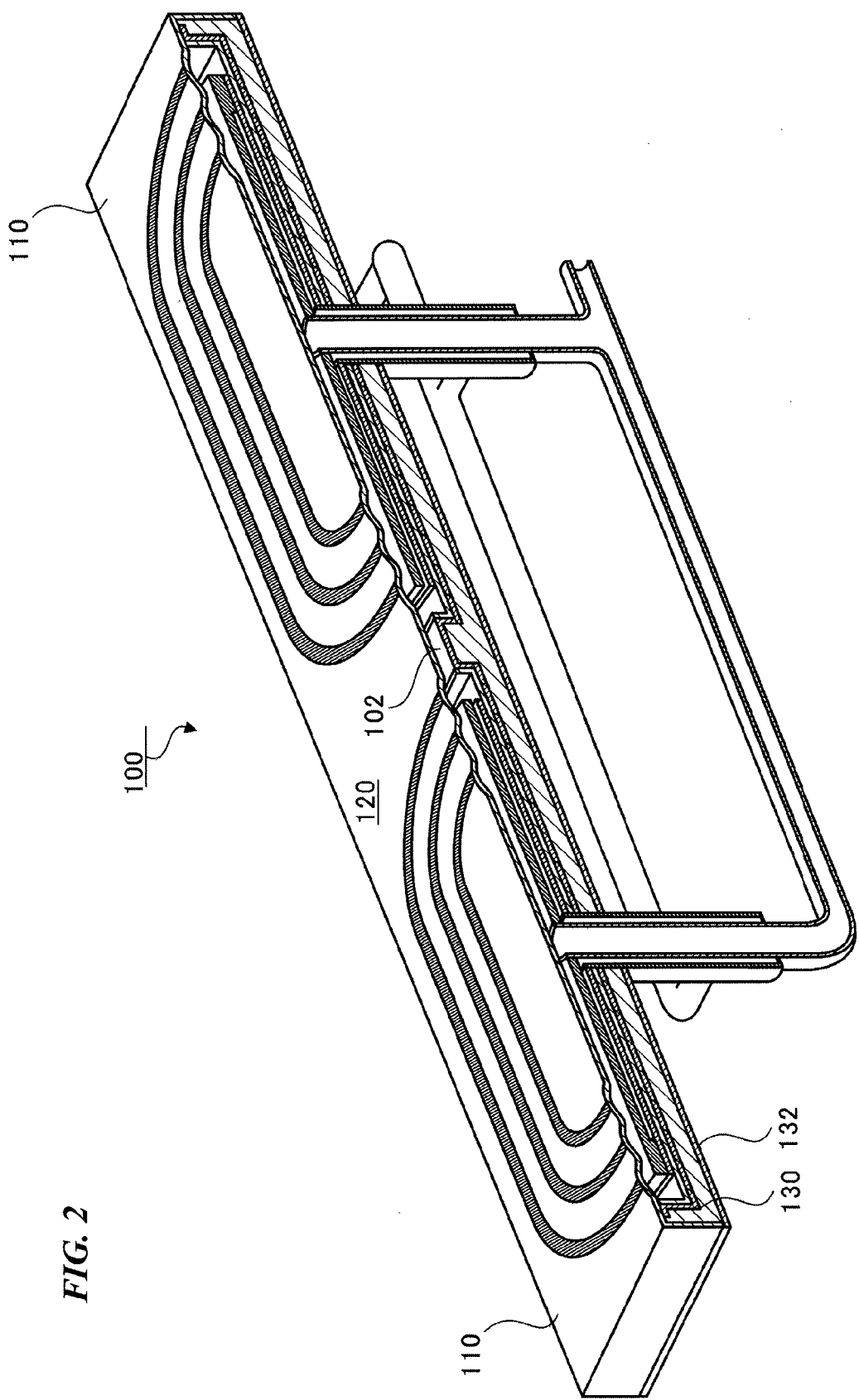
FIG. 2 is a perspective view showing a cross section taken along line II-II of FIG. 1.

FIG. 1 is a perspective view showing an example of an appearance of a combustion heating system 100, and FIG. 2 is a perspective view showing a cross-section taken along line II-II of FIG. 1. While the combustion heating system 100 according to the embodiment is a pre-mixing type in which town gas or the like and air serving as an oxidizer gas for combustion are mixed before supply into a main body container, the present disclosure is not limited thereto but may be a so-called diffusion type in which diffusion combustion is performed.

As shown in FIGS. 1 and 2, in the combustion heating system 100, a plurality of (here, two) combustion heaters 110 are continuously installed, a mixed gas (hereinafter referred to as "a fuel gas") of the town gas or the like and the air is supplied, and the fuel gas is combusted in the combustion heaters 110 to generate heat. Then, in the combustion heating system 100, an exhaust gas generated by the combustion is collected.

In addition, a fire spreading section 102 in communication with a closed space in the continuously installed combustion heaters 110 is formed at a connecting area between the combustion heaters 110. However, when the fire spreading section 102 is used with a gas, the closed space may not be completely closed.

In the combustion heating system 100 of the embodiment, for example, with one ignition by an ignition apparatus such as an igniter (not shown) or the like, a flame is spread and ignited in the continuously installed combustion heaters 110 through the fire spreading section 102. As described above, while the two combustion heaters 110 are installed in the combustion heating system 100, since both of the combustion heaters 110 have the same structure, only one of the combustion heaters 110 will be described.

Figure 3A:
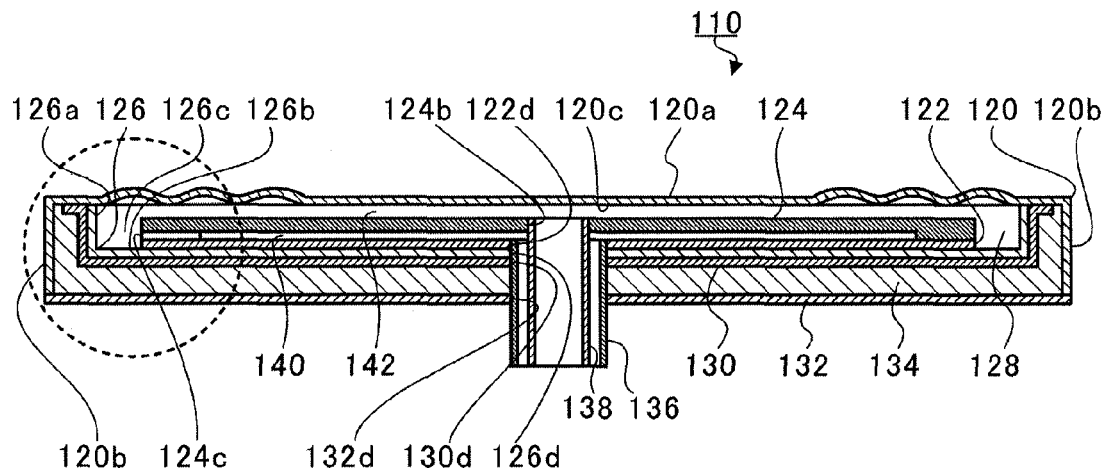
FIG. 3A is a cross-sectional view taken along line III(a)-III(a) of FIG. 1 showing a combustion heater.
Figure 3B:
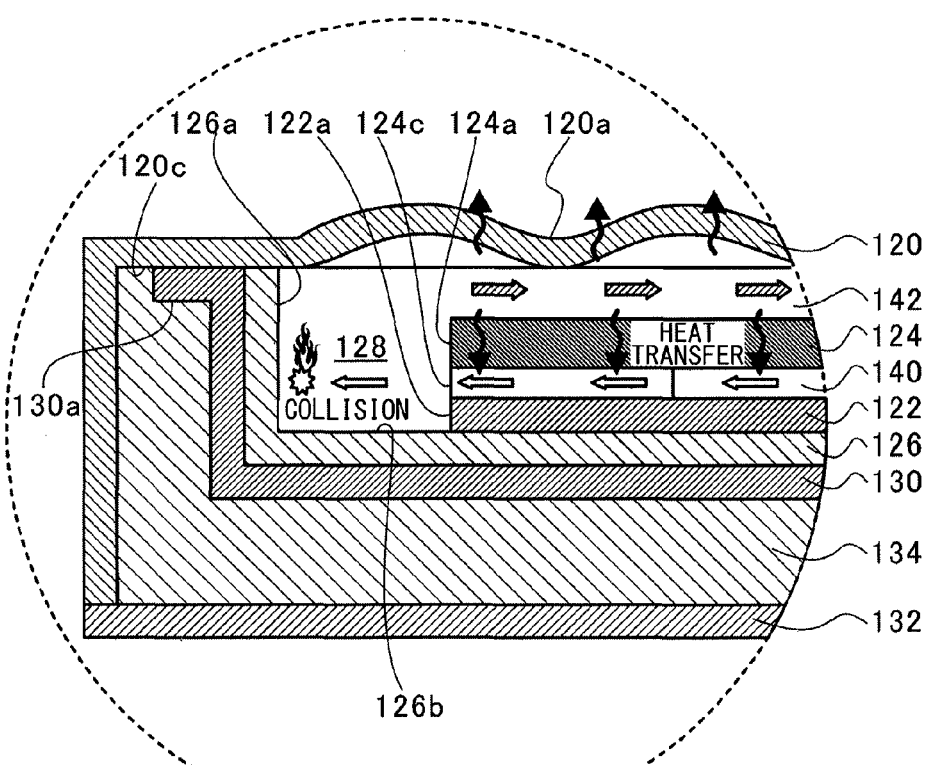
FIG. 3B is an enlarged view of a portion surrounded by a broken line of FIG. 3A.

FIGS. 3A and 313 are views showing the combustion heater 110. FIG. 3A is a cross-sectional view taken along line III(a)-III(a) of FIG. 1, and FIG. 3B is an enlarged view of a portion surrounded by a broken line of FIG. 3A. In FIG. 3B, a white arrow represents a flow of a fuel gas, a hatched arrow represents a flow of an exhaust gas, and a black arrow represents movement of heat.

As shown in FIGS. 3A and 3B, the combustion heater 110 is configured to include a heating plate 120, a disposition plate 122, a partition plate 124, an insulating section 126, a combustion chamber 128, a closed section 130, a sealed section 132, an insulating material 134, a first pipeline section 136, a second pipeline section 138, an introduction section 140 and a guide section 142.

The heating plate 120 is a thin plate-shape member formed of a material having a high heat resisting property and oxidation resistance such as stainless steel (SUS), a material having high thermal conductivity such as brass, or the like. The heating plate 120 has a first radiation surface 120a. The first radiation surface 120a is formed in a substantially rectangular shape (see FIG. 1), is heated by heat generated by the combustion, and transfers radiant heat to a baking object.

An outer wall section 120b of the heating plate 120 is curved at an outer circumference of the first radiation surface 120a to stand (extend) in a direction perpendicular to the first radiation surface 120a and spaced apart from the first radiation surface 120a (in FIG. 3A, a downward direction) to form a side surface of the combustion heating system 100.

In the embodiment, the heating plates 120 of the two combustion heaters 110 are integrally formed with each other (see FIG. 2). The heating plate 120 has a hole constituted by an inner surface of the outer wall section 120b serving as a side surface and a back surface 120c of the first radiation surface 120a serving as a bottom surface, and components of the two combustion heaters 110 are disposed in the hole.

The disposition plate 122 is a flat plate-shaped member formed of a material having a high heat resisting property and oxidation resistance such as stainless steel, a material having low thermal conductivity, or the like. The disposition plate 122 is disposed to be substantially parallel to the back surface 120c of the first radiation surface 120a of the heating plate 120 inside the outer wall section 120b of the heating plate 120.

Like the heating plate 120, the partition plate 124 is a thin plate-shape member formed of a material having a high heat resisting property and oxidation resistance such as stainless steel, a material having high thermal conductivity such as brass, or the like. The partition plate 124 is disposed to be substantially parallel to the disposition plate 122 between the back surface 120c of the heating plate 120 and the disposition plate 122 inside the outer wall section 120b of the heating plate 120.

In the disposition plate 122 and the partition plate 124, contours of outer circumferences (exteriors) of opposite surfaces are approximately equal to each other, and each has a track shape (a shape in which two short sides of a rectangular shape are changed into line-symmetrical arcs (semi-circular shapes)).

The heating plate 120, the disposition plate 122 and the partition plate 124 may be disposed to be inclined to face each other as long as an aperture is formed therebetween. In addition, thicknesses of the heating plate 120, the disposition plate 122 and the partition plate 124 are not limited, and these plates are not limited to flat plates but may be formed in concavo-convex shapes.

The insulating section 126 is a thin plate-shaped member formed of a material with high thermal insulation (having thermal insulation), such as a ceramic or the like. The insulating section 126 has an outer circumferential section 126a and a bottom surface section 126b.

The outer circumferential section 126a is disposed at an outer circumferential side of the partition plate 124, and extends along the outer circumference of the partition plate 124 in opposite directions of the heating plate 120 and the disposition plate 122 (in FIG. 3A, upward and downward directions). The bottom surface section 126b is an area that is curved and continues from an area of the disposition plate 122 side (in FIG. 3A, a lower side) of the outer circumferential section 126a, extends toward a center of the disposition plate 122, and is disposed to face the heating plate 120.

Further, the insulating section 126 has a hole 126c constituted by the bottom surface section 126b serving as a bottom surface and the inner surface of the outer circumferential section 126a serving as a side surface, and a contour of the hole 126c has a track shape similar to the appearances of the disposition plate 122 and the partition plate 124. Then, the outer circumferential section 126a is spaced an equal interval from an outer circumferential surface 122a of the disposition plate 122 and an outer circumferential surface 124a of the partition plate 124 via the hole 126c.

As shown in FIG. 3B, the combustion chamber 128 is disposed between the outer circumferential section 126a and the outer circumferential surfaces 122a and 124a of the disposition plate 122 and the partition plate 124, and faces the outer circumferential surfaces 122a and 124a. That is, the combustion chamber 128 has a space surrounded by the outer circumferential surfaces 122a and 124a, the heating plate 120 and the insulating section 126, and disposed inside the outer circumferential section 126a along the outer circumferential section 126a (i.e., a space overlapping the hole 126c).

The closed section 130 may be constituted by a thin plate-shaped member formed of a material having lower thermal insulation than the insulating section 126, for example, stainless steel or the like. In the embodiment, the closed sections 130 of the two combustion heaters 110 are integrally formed with each other (see FIG. 2).

In addition, as shown in FIG. 3B, the closed section 130 has a curved section 130a disposed at a contact portion between the closed section 130 and the back surface 120c of the first radiation surface 120a and extending in the surface direction of the back surface 120c (hereinafter, simply referred to as "a surface direction"), and the curved section 130a is joined to the back surface 120c of the heating plate 120 through welding, brazing, or the like. For this reason, gas leakage toward the insulating section 126 of the combustion chamber 128 is prevented or suppressed by the closed section 130.

Meanwhile, the insulating section 126 is not adhered to any contacting member, and the outer circumferential section 126a and the bottom surface section 126b of the insulating section 126 are covered and supported by the closed section 130 from an opposite side of the combustion chamber 128. As a result, although the insulating section 126 is not adhered to any contacting member, movement of the insulating section 126 is restricted such that relative positional deviation between the insulating section 126 and the closed section 130 does not occur due to the disposition plate 122 or the closed section 130.

The sealed section 132 is a flat plate-shaped member disposed at a side of the heating plate 120 opposite to the first radiation surface 120a. In the embodiment, like the heating plate 120, the sealed sections 132 of the two combustion heaters 110 are integrally formed with each other (see FIG. 2). Then, the sealed section 132 is fixed to an end section in an extending direction (in FIG. 3A, a downward direction) of the outer wall section 120b of the heating plate 120 at a position spaced apart from the closed section 130, and the insulating material 134 such as wool or the like having thermal insulation is sealed in a space between the sealed section 132 and the closed section 130.

In this way, the main body container of the combustion heating system 100 is composed by closing the hole 126c of the heating plate 120 with the sealed section 132, and an area of upper and lower wall surfaces (outer surfaces of the first radiation surface 120a of the heating plate 120 and the sealed section 132) is larger than an area of an outer circumferential surface (an outer surface of the outer wall section 120b of the heating plate 120). That is, the upper and lower wall surfaces occupy most of the outer surface of the main body container.

The first pipeline section 136 is a pipeline through which a fuel gas flows, and the second pipeline section 138 is a pipeline through which an exhaust gas flows. The second pipeline section 138 is disposed in the first pipeline section 136. That is, the first pipeline section 136 and the second pipeline section 138 form a double pipe at a connecting portion to the combustion heater 110.

Through-holes 122d, 126d, 130d and 132d passing in a thickness direction are formed in the disposition plate 122, the insulating section 126, the closed section 130 and the sealed section 132. The through-holes 122d, 126d, 130d and 132d have a positional relation in which the through-holes overlap in the central section in the surface direction of the disposition plate 122, the insulating section 126, the closed section 130 and the sealed section 132. The first pipeline section 136 is inserted through the through-holes 122d, 126d, 130d and 132d. Then, the end section of the first pipeline section 136 is fixed to the through-hole 122d of the disposition plate 122 at a position flush with a surface of the partition plate 124 side of the disposition plate 122, and a portion of the first pipeline section 136 inserted through the through-hole 130d of the closed section 130 is joined to the through-hole 130d through welding, brazing, or the like.

In addition, an exhaust hole 124b disposed at a position overlapping the through-hole 122d of the disposition plate 122, having a diameter smaller than the through-hole 122d and passing in the thickness direction is formed in the partition plate 124. The second pipeline section 138 is inserted through the exhaust hole 124b, and the end section of the second pipeline section 138 is fixed to the exhaust hole 124b at a position flush with a surface of the first radiation surface 120a side of the partition plate 124.

The end section of the second pipeline section 138 protrudes closer to the first radiation surface 120a than the end section of the first pipeline section 136 and is spaced apart from the heating plate 120, and the partition plate 124 is spaced an equal interval from the heating plate 120 and the disposition plate 122 as the partition plate 124 is fixed to the end section of the second pipeline section 138 at a central side in the surface direction.

The introduction section 140 is formed by an aperture between the disposition plate 122 and the partition plate 124, and comes in communication with the first pipeline section 136. A fuel gas flows into the introduction section 140 from the through-hole 122d of the disposition plate 122 through the first pipeline section 136. That is, the through-hole 122d of the disposition plate 122 is an introduction hole through which the fuel gas flows into the introduction section 140. Then, the introduction section 140 radially guides the fuel gas flowing from the through-hole 122d (the introduction hole) of the disposition plate 122 toward the combustion chamber 128.

In addition, a flow path of the outlet side (the combustion chamber 128 side) of the introduction section 140 is partitioned into a plurality of sections by protrusions 124c disposed at the outer circumferential end section of the partition plate 124.

Figure 4:
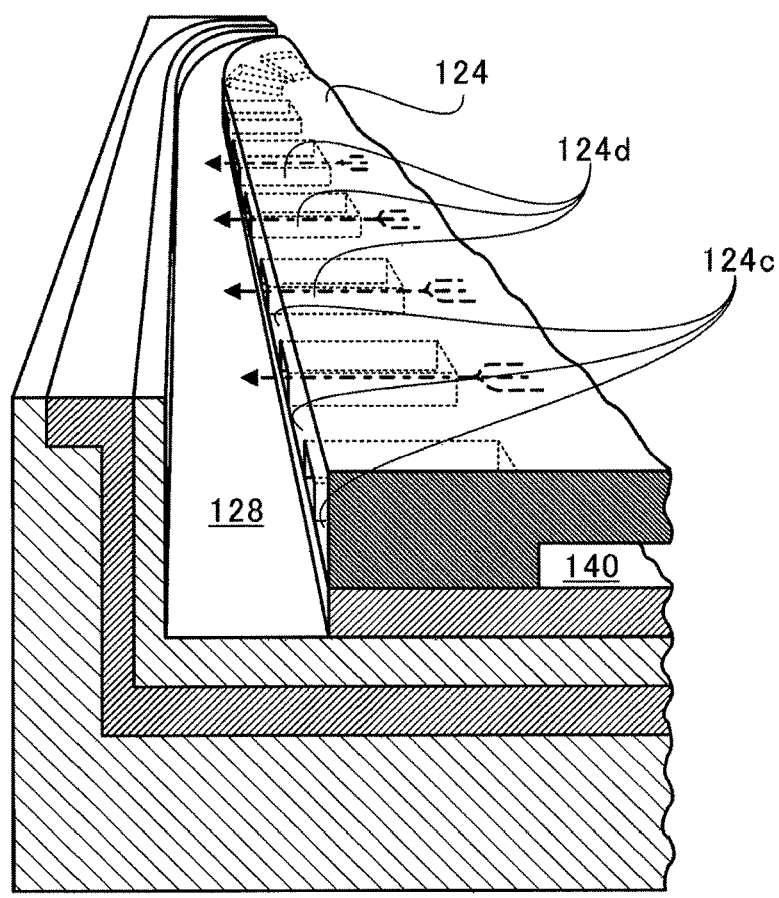
FIG. 4 is a view showing a protrusion.

FIG. 4 is a view for explaining the protrusion 124c, showing a perspective view of the combustion chamber 128 and a cross-sectional view of members that surround the combustion chamber 128. Further, here, for the purpose of understanding, a contour line of a concealed portion of the partition plate 124 seen when the heating plate 120 is removed is shown by broken lines.

As shown in FIG. 4, the protrusions 124c are formed at equal intervals in the circumferential direction of the partition plate 124, and a flow path 124d is formed between the adjoining protrusions 124c. Accordingly, the introduction section 140 and the combustion chamber 128 come in communication with each other by the flow path 124d which reduces a cross-sectional area of a communication portion between them. Here, an interval of the adjoining protrusions 124c, i.e., a width of the flow path 124d, is a representative dimension of a cross section of the flow path. Here, a quenching distance d of the fuel gas is represented by a size of a diameter of a tube wall model, and is obtained by the following Mathematical Formula 1.

$$d = 2\lambda \cdot Nu^{1/2}/(Cp \cdot \rho u \cdot Su) \qquad \text{Mathematical Formula 1}$$

In Mathematical Formula 1, $\lambda$ is thermal conductivity, $Nu$ is a Nusselt number, $Cp$ is an isopiestic specific heat, $\rho u$ is a density of a fuel gas, and $Su$ is a combustion velocity. Since the width of the flow path 124d is designed to be smaller than the quenching distance d, stable combustion in the combustion chamber 128 becomes possible.

As shown in FIG. 313, the fuel gas flowing into the combustion chamber 128 from the flow path 124d collides with the outer circumferential section 126a in the combustion chamber 128 and temporarily stays therein. The ignition apparatus is installed at the combustion chamber 128 of one of the two combustion heaters 110, and when the ignition apparatus ignites the fuel gas introduced from the introduction section 140, the fuel gas in the combustion chamber 128 of the other combustion heater 110 is also ignited via the fire spreading section 102.

In this way, in the combustion chamber 128, a fuel gas introduced from the introduction hole (the through-hole 122d of the disposition plate 122) is combusted. Then, combustion continues in both of the combustion chambers 128, and the exhaust gas generated by the combustion is guided to the guide section 142.

The guide section 142 is a flow path formed by the aperture between the heating plate 120 and the partition plate 124 using the heating plate 120 and the partition plate 124 as sidewalls. The guide section 142 continues to the combustion chamber 128 and comes in communication with the second pipeline section 138, collects the exhaust gas generated by the combustion in the combustion chamber 128 at a central side in the surface direction from the combustion chamber 128, and guides the exhaust gas to the outside of the combustion heater 110 from the exhaust hole 124b of the partition plate 124 via the second pipeline section 138.

The heating plate 120 is heated from the back surface 120c of the first radiation surface 120a by combustion heat in the combustion chamber 128 and heat of the exhaust gas flowing through the combustion chamber 128 and the guide section 142. Then, the baking object is heated by the radiant heat from the first radiation surface 120a.

In addition, since the partition plate 124 is formed of a material having relatively better thermal conductivity, the exhaust gas flowing through the guide section 142 transfers heat to the fuel gas flowing through the introduction section 140 via the partition plate 124 (see FIG. 3B). In particular, since the exhaust gas flowing through the guide section 142 and the fuel gas flowing through the introduction section 140 form counter flows with the partition plate 124 sandwiched therebetween, the fuel gas can be efficiently preheated by the heat of the exhaust gas, and thus high thermal efficiency can be obtained.

Similarly, the exhaust gas flowing through the second pipeline section 138 flows into the first pipeline section 136 through the second pipeline section 138 to transfer heat to the fuel gas that is a counter flow, and preheating the fuel gas. Combustion of the fuel gas is stabilized by so-called excess enthalpy combustion in which the fuel gas is preheated and combusted in this way, and concentration of CO (carbon monoxide) generated by imperfect combustion can be suppressed to an extremely low concentration.

Next, a continuous heating furnace 200 in which the plurality of combustion heating systems 100 are disposed will be described.

Figure 5:
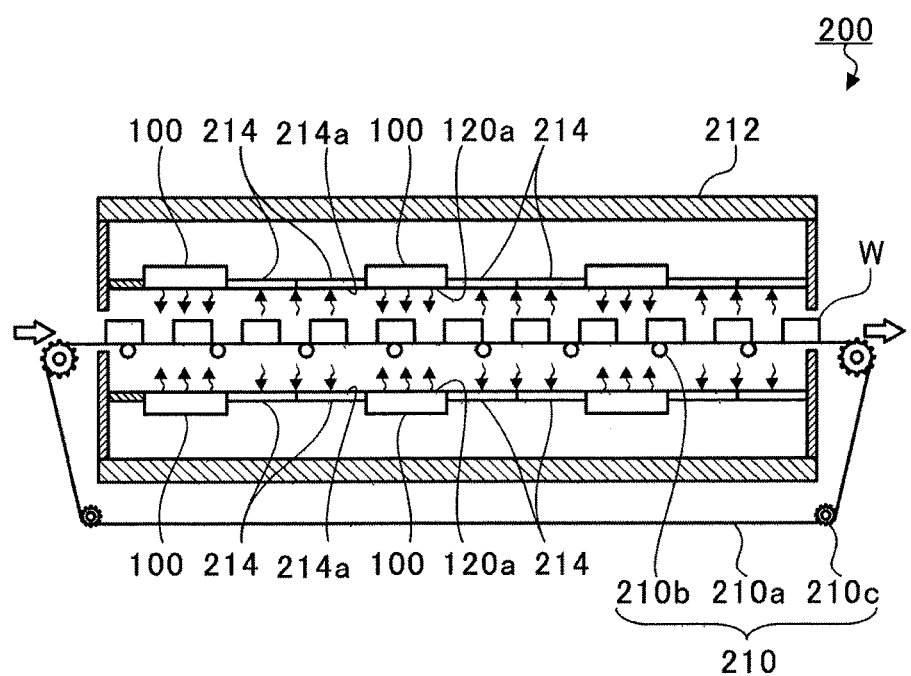
FIG. 5 is a view showing a continuous heating furnace.

FIG. 5 is a view for explaining the continuous heating furnace 200, showing a schematic view of a cross section in a direction parallel to and perpendicular to the conveyance direction of a baking object W in the continuous heating furnace 200. As shown in FIG. 5, the continuous heating furnace 200 is configured to include a conveyance unit 210, a furnace main body 212, a plurality of combustion heating systems 100 (heating sections) and a plurality of cooling preheaters 214.

For example, the conveyance unit 210 is configured to include a conveyor 210a such as a belt or the like, rollers 210b configured to stretch and support the conveyor 210a, a motor mechanism 210c having a gear and a motor, and so on. The conveyor 210a is rotated by power of the motor mechanism 210c, and the baking object W is conveyed in a direction of a white arrow of FIG. 5. While the baking object W is placed on the conveyance unit 210 in FIG. 5, for example, the baking object W may be suspended by a suspension mechanism (not shown) installed at the conveyance unit 210. In addition, for example, the conveyor 210a may have a mesh structure or the like such that heat transfer between the combustion heating system 100 or the cooling preheater 214 disposed at a vertical lower side and the baking object W is not disturbed.

In addition, the rollers 210b support a portion of the conveyor 210a in the furnace main body 212 from a vertical lower side. Further, in order to prevent the bending of the baking object W, when the conveyor is constituted by a pair of nets that sandwich upper and lower sides of the baking object W, the rollers 210b may be installed outside the pair of nets.

The furnace main body 212 partially or entirely surrounds the conveyor 210a, and a baking space is formed therein. In addition, the plurality of combustion heating systems 100 are provided while the first radiation surfaces 120a are disposed in parallel in a conveyance direction of the baking object W (hereinafter, simply referred to as "a conveyance direction") and the first radiation surfaces 120a are opposite to the conveyor 210a in the furnace main body 212 at a vertical upper side and a vertical lower side of the conveyance unit 210 in the furnace main body 212.

That is, the first radiation surfaces 120a heat the baking object W when the first radiation surfaces 120a are opposite to the baking object W conveyed by the conveyance unit 210 with no shield interposed therebetween.

In the furnace main body 212, two cooling preheaters 214 are juxtaposed to every one combustion heating system 100 (the combustion heaters 110) at downstream side of the conveyance direction.

In addition, the cooling preheater 214 has a second radiation surface 214a configured to cool the baking object W. The second radiation surface 214a receives the radiant heat from the baking object W when the second radiation surface 214a is opposite to the baking object W conveyed by the conveyance unit 210 with no shield interposed therebetween.

In this way, the combustion heating system 100 and the cooling preheater 214 perform heat exchange between the baking object W and the combustion heating system 100 or the cooling preheater 214 when the baking object W conveyed by the conveyance unit 210 is opposite to the combustion heating system 100 and the cooling preheater 214 with no shield interposed therebetween (when the baking object W is disposed immediately over or under the combustion heating system 100 or the cooling preheater 214). Accordingly, distances from the combustion heating system 100 and the cooling preheater 214 to the baking object W are smallest upon the heat exchange, and heat exchange between the combustion heating system 100, the cooling preheater 214 and the baking object W is directly and effectively performed.

Like the combustion heating system 100, the cooling preheaters 214 are disposed such that the second radiation surfaces 214a are disposed in parallel in the conveyance direction and the second radiation surface 214a is opposite to the conveyor 210a in the furnace main body 212. That is, the first radiation surface 120a of the combustion heating system 100 and the second radiation surface 214a of the cooling preheater 214 are disposed to adjoin each other in the conveyance direction of the baking object W, and the first radiation surface 120a and the second radiation surface 214a are parallel to each other.

In addition, in the continuous heating furnace 200, as described above, the combination of at least the combustion heating system 100 and the cooling preheater 214 is in the atmosphere in the furnace main body 212 (in the baking space).

Figure 6A:
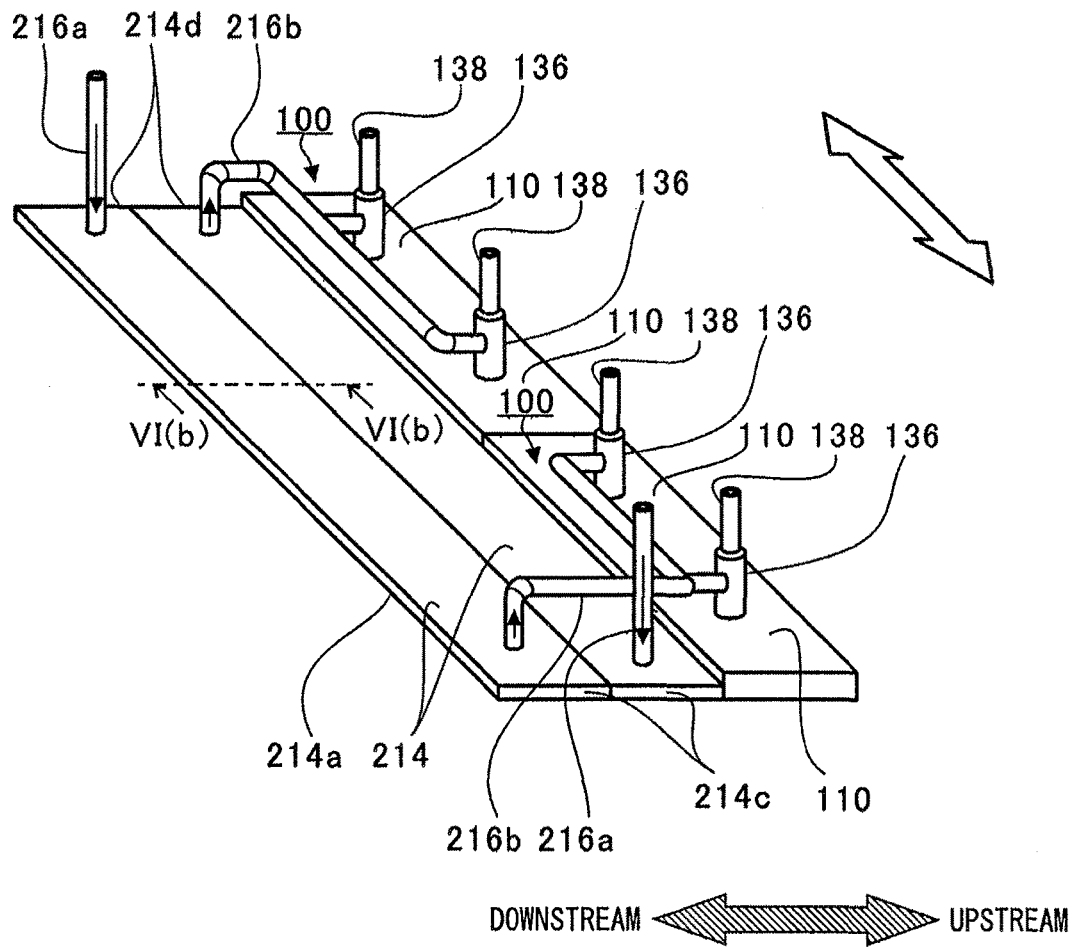
FIG. 6A is a perspective view showing disposition of a combustion heating system and a cooling preheater.
Figure 6B:
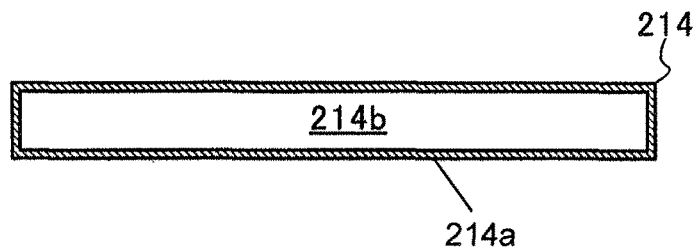
FIG. 6B is a cross-sectional view of the cooling preheater taken along line VI(b)-VI(b) of FIG. 6A.

FIGS. 6A and 6B is a view showing disposition of the combustion heating system 100 and the cooling preheater 214, FIG. 6A shows a perspective view of the combustion heating system 100 and the cooling preheater 214, and FIG. 613 shows a cross section of the cooling preheater 214 taken along line VI(b)-VI(b) of FIG. 6A. Further, in FIG. 6A, for the purpose of easy understanding of a connection relation between the cooling preheater 214 and the first pipeline section 136, a portion of the second pipeline section 138 is omitted, and a flow of the fuel gas is shown by a solid line.

As shown in FIG. 6A, the combustion heating system 100 is disposed such that the width direction of the furnace main body 212 (a horizontal direction perpendicular to the conveyance direction, the horizontal direction being represented by white arrows in FIG. 6A; hereinafter, simply referred to as "a width direction") becomes a direction in which the combustion heaters 110 are continuously installed. In addition, in the furnace main body 212, the two combustion heating systems 100 are continuously installed in the width direction. Accordingly, the four combustion heaters 110 are aligned in the width direction.

In addition, a length in the width direction of the cooling preheater 214 is approximately equal to a sum of lengths in the width direction of the two combustion heating systems 100. Then, as shown in FIG. 6B, a gas flow path 214b is formed in the cooling preheater 214. As the fuel gas flows through the gas flow path 214b, the fuel gas is preheated by the heat from the second radiation surface 214a while the second radiation surface 214a is cooled.

Here, as shown in FIG. 613, the cooling preheater 214 forms a shape extending in the conveyance direction and the width direction. As a result, a preheating area of the gas flow path 214b via the second radiation surface 214a can be relatively widened, and preheating of the fuel gas in the gas flow path 214b can be effectively performed.

A supply pipe 216a is connected to the cooling preheater 214, and the fuel gas supplied from the outside is supplied into the gas flow path 214b. An end section of the supply pipe 216a adjacent to the cooling preheater 214 is disposed at either one end 214c side or the other end 214d side in the width direction of the second radiation surface 214a. As a result, in the adjoining cooling preheaters 214, position of the end sections of communication pipes 216b adjacent to the cooling preheater 214 are reversed in the width direction at the cooling preheater 214 installed in downstream side and the cooling preheater 214 installed in upstream side in the conveyance direction.

A direction of the supply pipe 216a is not parallel to but perpendicular to the second radiation surface 214a. That is, the supply pipe 216a is connected to the cooling preheater 214 to be perpendicular to the second radiation surface 214a. For this reason, the fuel gas flowing into the cooling preheater 214 from the supply pipe 216a collides with a back side of the second radiation surface 214a, and heat exchange between the fuel gas and the second radiation surface 214a is accelerated.

The communication pipe 216b brings the first pipeline section 136 and the cooling preheater 214 (the gas flow path 214b) in communication with each other. A position of the end section of the communication pipe 216b adjacent to the cooling preheater 214 is opposite to a connection position to the supply pipe 216a in the width direction.

In this way, the cooling preheater 214 (the gas flow path 214b) comes in communication with the first pipeline sections 136 of the combustion heating systems 100 juxtaposed to the conveyance direction via the communication pipe 216b. Specifically, the cooling preheater 214 comes in communication with the through-hole 122d (see FIG. 3A) formed in the disposition plate 122 of the combustion heater 110 that constitutes the combustion heating system 100.

In addition, one of the first pipeline sections 136 in the two combustion heating systems 100 juxtaposed to the width direction comes in communication with the cooling preheater 214 juxtaposed to downstream side in the conveyance direction of the combustion heating system 100, and the other first pipeline section 136 comes in communication with the cooling preheater 214 juxtaposed to upstream side.

That is, the same number of cooling preheaters 214 as the combustion heating systems 100 are installed in the furnace main body 212, and the cooling preheater 214 comes in communication with the first pipeline section 136 connected to the different combustion heating systems 100.

As described above, as the combustion heating systems 100 and the cooling preheaters 214 are alternately disposed in the conveyance direction, baking and cooling of the conveyed baking object W are alternately repeated. For this reason, heat can be sufficiently transferred to the inside of the baking object W without excessively heating the surface of the baking object W. In addition, since the combustion heating system 100 and the cooling preheater 214 are disposed in the furnace main body 212 and heat of the baking object W cooled by the cooling preheater 214 is transferred to the fuel gas, heat loss is limited in comparison with the configuration in which the baking object W is air-cooled outside of the furnace main body 212.

In addition, as the combustion heating systems 100 and the cooling preheaters 214 are disposed to adjoin each other in the conveyance direction, disposition of the combustion heating systems 100 and the cooling preheaters 214 becomes compact, and the entire length in the conveyance direction of the continuous heating furnace 200 can be reduced.

In addition, in the embodiment, the baking object W is heated by the radiant heat from the first radiation surface 120a (the combustion heating system 100), and cooled by heat dissipation by radiation to the second radiation surface 214a (the cooling preheater 214).

Here, as a comparative example, for example, a continuous heating furnace configured to heat and cool the baking object W using convection such as air, an exhaust gas, or the like will be assumed. In convective heat transfer, since the surface of the baking object W and the convection fluid (air, an exhaust gas, or the like) come in contact with each other, a difference between a surface temperature of the baking object W and a temperature of the fluid is reduced. Then, a heat flux (a heat transfer amount) in proportion to the temperature difference is extremely decreased, and sufficient heat transfer with respect to the inside of the baking object W is not performed. Meanwhile, in the radiation heat transfer, since the baking object W and the radiation surface (the first radiation surface 120a and the second radiation surface 214a) do not come in contact with each other and the temperature difference is hard to decrease, the heat flux in proportion to a finite difference of the fourth power of a Kelvin temperature of each of the baking object W and the radiation surface is maintained relatively stably. For this reason, the heat can be sufficiently transferred to the inside of the baking object W.

In addition, the heat flux of the radiation heat transfer is mostly uninfluenced by the temperature of the atmosphere of the baking object W. For this reason, even when the air warmed by the combustion heating system 100 exerts an influence on the cooling preheater 214 side, a decrease in cooling performance of the baking object W does not occur as easily as in the above-mentioned comparative example. Further, since the continuous heating furnace 200 has a heat transfer type independent from the atmosphere of the baking object W, even when the surroundings of the baking object W are a vacuum, heating or cooling of the baking object W becomes possible.

Figure 7:
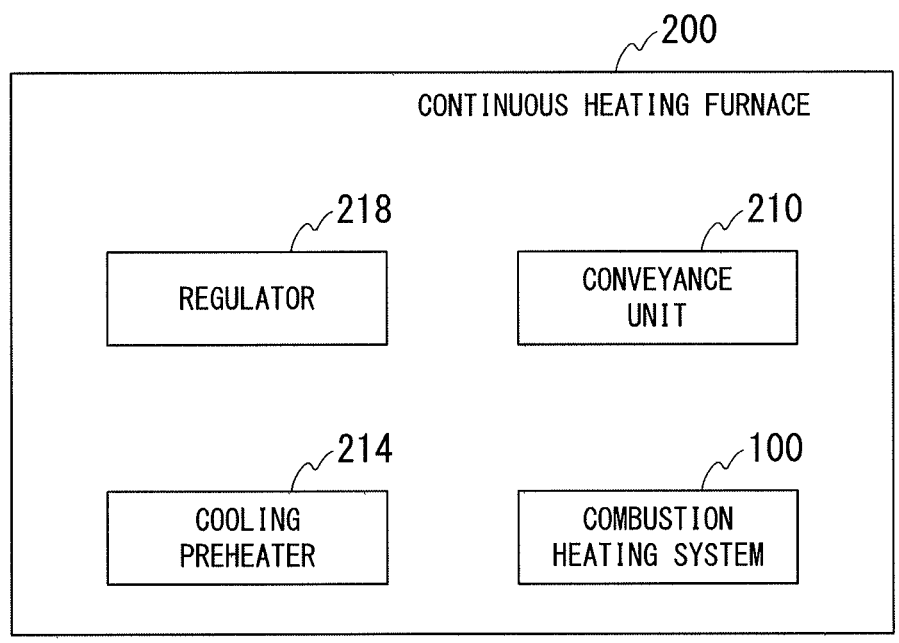
FIG. 7 is a functional block diagram showing a schematic configuration of the continuous heating furnace.

FIG. 7 is a functional block diagram showing a schematic configuration of the continuous heating furnace 200. As shown in FIG. 7, the continuous heating furnace 200 is configured to include a regulator 218, in addition to the conveyance unit 210, the combustion heating system 100 and the cooling preheater 214.

For example, as the regulator 218 is constituted by a cover member or the like having a radiation rate lower than that of the second radiation surface 214a and covers a portion of the second radiation surface 214a, a heat transfer amount by the radiant heat from the surface of the baking object W to the second radiation surface 214a is regulated.

Figure 8A:
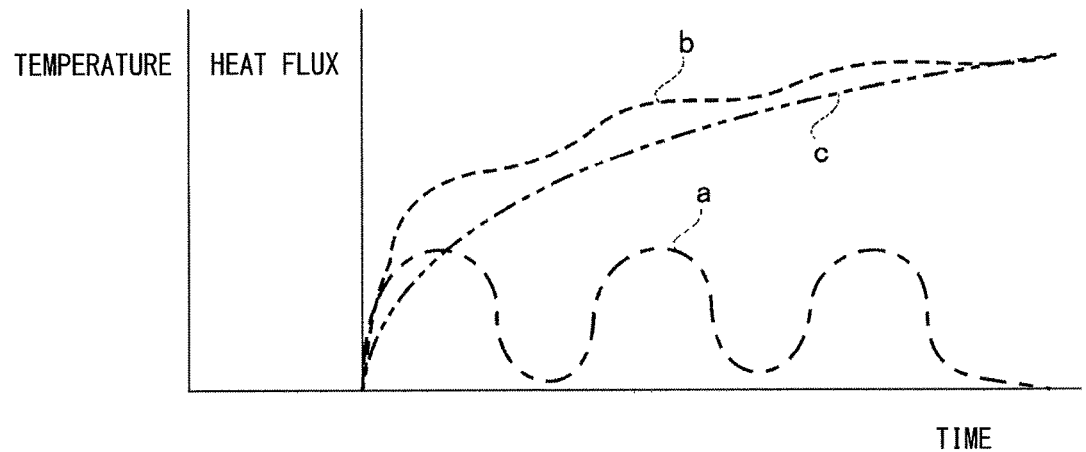
FIG. 8A is a view showing a function of a regulator.
Figure 8B:
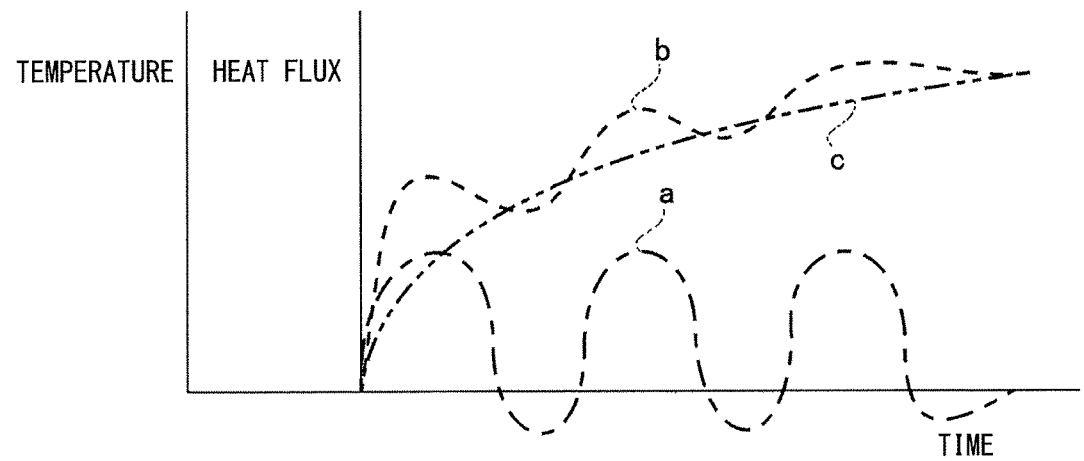
FIG. 8B is a view showing the function of the regulator.

FIGS. 8A and 8B are views showing a function of the regulator 218, and both of FIGS. 8A and 8B show a variation in the heat flux to the baking object W conveyed into the furnace main body 212. FIG. 8A shows the case in which regulation is performed by the regulator 218, and FIG. 8B shows the case in which regulation is not performed by the regulator 218. Further, in FIGS. 8A and 8B, a horizontal axis represents time, and a vertical axis represents a heat flux and a temperature. In FIGS. 8A and 8B, an explanatory note a represents a heat flux to the baking object W, an explanatory note b represents a surface temperature of the baking object W, and an explanatory note c represents a central temperature of the baking object W.

As described above, heating by the combustion heating system 100 and cooling by the cooling preheater 214 are alternately repeated with respect to the baking object W. In this way, a temperature (a central temperature) in the baking object W is increased while suppressing an increase in the surface temperature of the baking object W. As shown in FIGS. 8A and 8B, the surface temperature and the central temperature of the baking object W eventually become approximately uniform.

In addition, in either of FIG. 8A and 8B, upon heating of the baking object W, the surface temperature of the baking object W is higher than the central temperature of the baking object W, and the heat flux from the surface of the baking object W toward the inside has a positive value.

Meanwhile, upon cooling of the baking object W, cooling performance by the cooling preheater 214 is excessively enhanced, as shown in FIG. 8B, the surface temperature of the baking object W is lower than the central temperature of the baking object W, and the heat flux from the surface to the inside of the baking object W has a negative value. This shows that the baking object W is cooled as heat is radiated from the baking object W. In this case, in heating to the caloric value necessary for baking of the baking object W, a thermal dose (a heating time or an output) by the combustion heating system 100 should be increased depending on the amount of heat radiated, and thus heat loss occurs.

In the embodiment, cooling performance by the cooling preheater 214 is appropriately suppressed by the regulator 218, as shown in FIG. 8A, upon cooling of the baking object W, the surface temperature of the baking object W is maintained at a temperature higher than the central temperature of the baking object W, and the heat flux from the surface to the inside of the baking object W has a positive value. That is, radiation from the baking object W does not occur.

In this way, the regulator 218 regulates the heat transfer amount by the radiant heat from the surface of the baking object W to the second radiation surface 214a such that the surface temperature of the baking object W is maintained at the central temperature of the baking object W or more. For this reason, there is no need for heating to supplement the radiation from the baking object W, and heat loss can be suppressed.

Figure 9A:
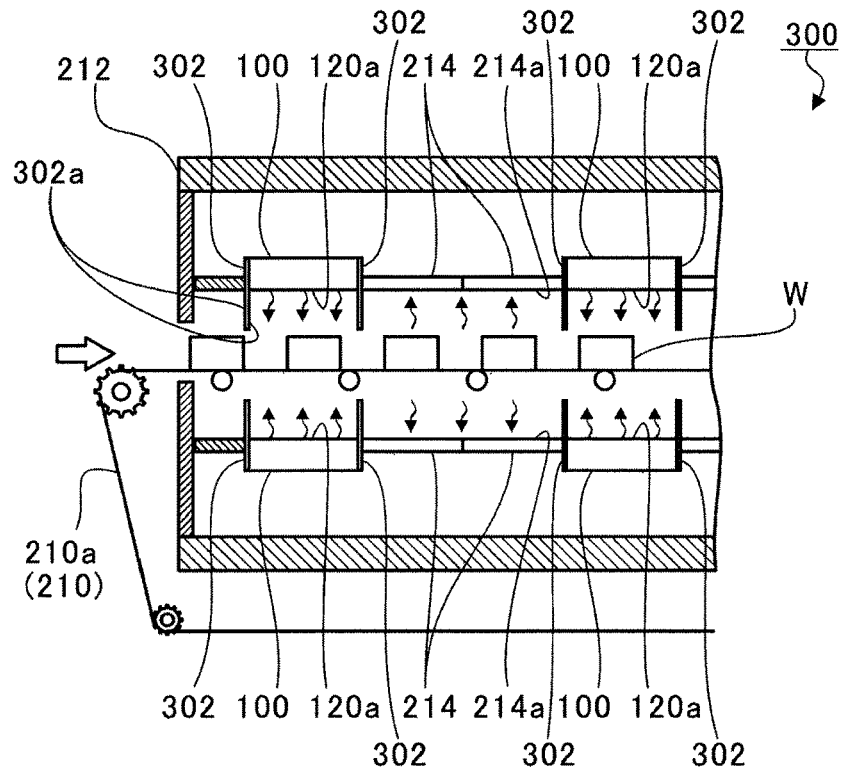
FIG. 9A is a view showing a variant of the continuous heating furnace according to the present disclosure.
Figure 9B:
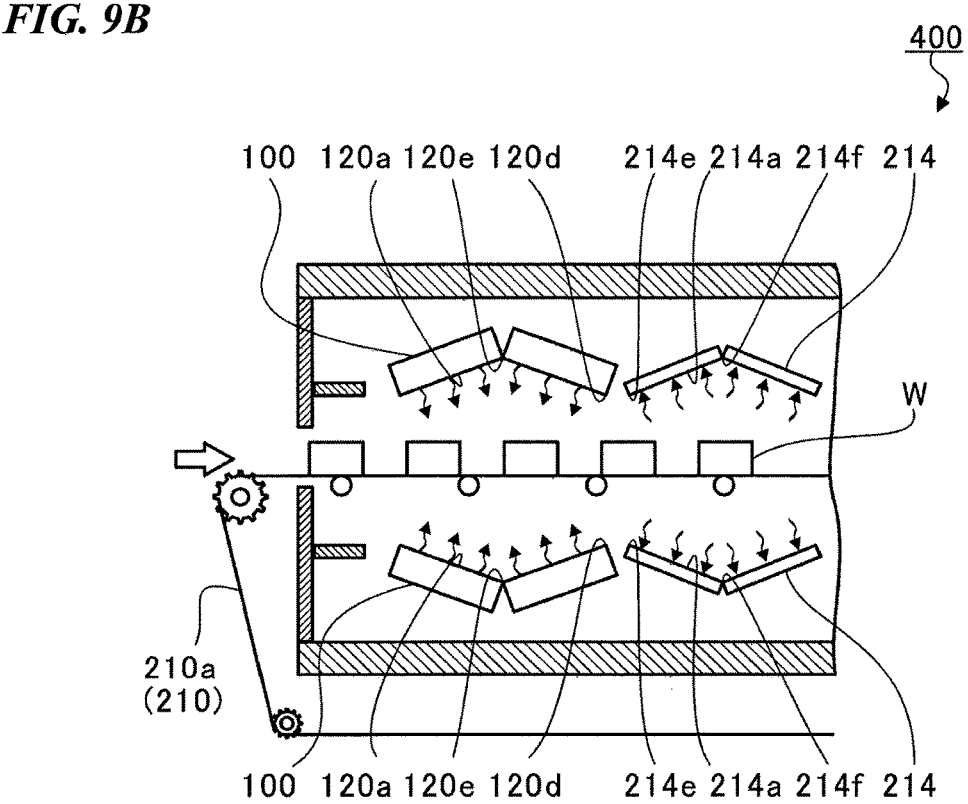
FIG. 9B is a view showing the variant of the continuous heating furnace according to the present disclosure.

FIGS. 9A and 9B are views showing a variant of the continuous heating furnace according to the present disclosure, FIG. 9A shows a first variant, and FIG. 9B shows a second variant. Further, in FIGS. 9A and 9B, schematic cross-sectional views of continuous heating furnaces 300 and 400 corresponding to FIG. 5 are shown by enlarging an end section at upstream side in the conveyance direction.

The continuous heating furnace 300 shown in FIG. 9A includes a shielding section 302, in addition to the same components as the continuous heating furnace 200 of the above-mentioned embodiment. The shielding section 302 is disposed between the first radiation surface 120a of the combustion heating system 100 and the second radiation surface 214a of the cooling preheater 214 in the conveyance direction. Further, the shielding section 302 is disposed upstream side of the first radiation surface 120a of the combustion heating system 100 disposed furthest upstream in the conveyance direction.

In addition, the shielding section 302 has a surface 302a perpendicular to both of the first radiation surface 120a and the second radiation surface 214a, and in the direction perpendicular to the conveyance direction, extends closer to the baking object W (the conveyor 210a in the furnace main body 212) than the first radiation surface 120a and the second radiation surface 214a.

Then, the shielding section 302 shields between the baking object W and the second radiation surface 214a upon the heating of the baking object W, i.e., when the baking object W is conveyed to a position opposite to the first radiation surface 120a. For this reason, the heat loss by the radiation from the baking object W to the second radiation surface 214a is limited, and the baking object W can be efficiently heated. In addition, the shielding section 302 shields between the baking object W and the first radiation surface 120a upon the cooling of the baking object W, i.e., when the baking object W is conveyed to a position opposite to the second radiation surface 214a. For this reason, heat transfer by radiation from the first radiation surface 120a to the baking object W is limited, and an increase in the surface temperature of the baking object W can be effectively suppressed. According to the related configuration, modulation of the heating and the cooling with respect to the baking object W is increased, and sufficient heating to the inside of the baking object W becomes possible.

The continuous heating furnace 400 shown in FIG. 9B includes the same components as the above-mentioned continuous heating furnace 200. However, unlike the continuous heating furnace 200, the combustion heating systems 100 are disposed one by one in the width direction, and two each of the combustion heating systems 100 and the cooling preheaters 214 are alternately disposed in the conveyance direction.

Then, in the first radiation surface 120a and the second radiation surface 214a that are adjacent to each other, the ends 120d and 214e, which are adjacent to each other, of both ends in the conveyance direction are inclined with respect to the conveyance direction to come closer to the conveyor 210a in the furnace main body 212 of conveyance unit 210 than the other ends 120e and 214f.

That is, the adjoining two combustion heating systems 100 are inclined in a direction in which the first radiation surfaces 120a are opposite to each other, rather than a state in which the first radiation surfaces 120a are parallel to each other. Similarly, the adjoining two cooling preheaters 214 are inclined in a direction in which the second radiation surfaces 214a are opposite to each other, rather than a state in which the second radiation surfaces 214a are parallel to each other.

As a result, upon the heating of the baking object W (when the baking object W is disposed below the first radiation surface 120a), since the second radiation surface 214a is oriented in a different direction from the baking object W, the heat loss by the radiation from the baking object W to the second radiation surface 214a is limited, and the baking object W can be efficiently heated. In addition, upon the cooling of the baking object W (when the baking object W is disposed below the second radiation surface 214a), since the first radiation surface 120a is oriented in a different direction from the baking object W, the heat transfer by the radiation from the first radiation surface 120a to the baking object W is limited, and an increase in the surface temperature of the baking object W can be effectively suppressed. According to the related configuration, modulation of the heating and the cooling with respect to the baking object W is increased, and sufficient heating to the inside of the baking object W becomes possible.

In addition, due to the structure of the continuous heating furnace, units constituted by the combustion heating systems 100 and the cooling preheaters 214 may be installed at intervals in the conveyance direction. In this case, as much heat dissipation as possible is required from the unit to a non-installation area of the unit in the continuous heating furnace.

Figure 10:
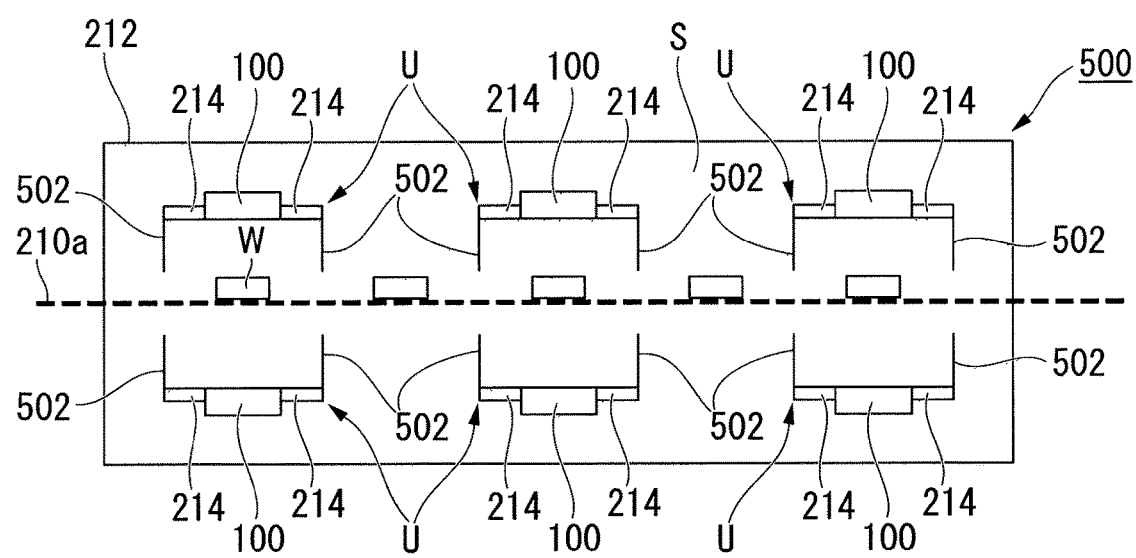
FIG. 10 is a view showing the variant of the continuous heating furnace according to the present disclosure.

In a continuous heating furnace 500 shown in FIG. 10, the cooling preheaters 214 adjoin upstream and downstream in the conveyance direction of the combustion heating system 100 to form a unit U configured to perform the heating and the cooling with respect to the baking object W. In addition, shielding sections 502 are installed upstream and downstream from each unit, and heat dissipation upstream and downstream from the unit U, in particular, heat dissipation due to radiation, is prevented by the shielding sections 502. Here, a specific configuration of each of the shielding sections 502 is the same as that of the shielding section 302 shown in FIG. 9A.

In the continuous heating furnace 500, as the units U are surrounded by the shielding sections 502 and heat dissipation from the unit U, in particular, heat dissipation by radiation is prevented, and improvement of heating efficiency in the unit U and prevention of excessive cooling by the cooling preheater 214 are achieved.

That is, even when the units U constituted by the combustion heating systems 100 and the cooling preheaters 214 are installed at intervals in the conveyance direction, heat dissipation from the unit U to the non-installation area of the unit U in the continuous heating furnace 500 (an area shown by reference numeral S of FIG. 10), in particular, heat dissipation due to radiation, is prevented by the shielding section 502. As a result, effective heating and slow cooling with respect to the baking object W and effective preheating of the combustion gas in the cooling preheater 214 become possible.

Further, the baking object in the continuous heating furnace of the embodiment is not particularly limited but may be, for example, a food. That is, the continuous heating furnace of the embodiment may be used for baking in a process of manufacturing foods such as cakes or the like. For example, the continuous heating furnace of the embodiment is used for manufacture of baked cakes, and more specifically, for example, may appropriately be used for manufacture of cakes (having thin shapes in many cases) formed of a source material such as a ground grain (rice or the like) for making rice crackers or chopped rice cakes.

While an exemplary embodiment of the present disclosure has been described above with reference to the accompanying drawings, it is needless to say that the present disclosure is not limited to this embodiment. It will be apparent to those skilled in the art that various modifications and amendments may be made without departing from the spirit of the present disclosure and fall under the scope of the present disclosure.

For example, the combustion heater 110 is not limited to the above-mentioned configuration, but another combustion heater (heating section) into which air, town gas, and a mixed gas of the air and the town gas (pre-mixed gas) are supplied, for example, a radiant tube burner, a line burner, an infrared ceramic burner, or the like, may be used.

In addition, in the above-mentioned embodiment and variant, while the case in which the premixed gas serving as the fuel gas flows into the gas flow path 214b of the cooling preheater 214 has been described, only the air or only the town gas may flow, and the air and the town gas may be mixed in the flow path from the gas flow path 214b to the combustion heating system 100.

In addition, in the above-mentioned embodiment and variant, while the combustion heating system 100 in which the two combustion heaters 110 serving as the heating sections are continuously installed are exemplarily described, the combustion heater 110 may be solely used as the heating section, and a combustion heating system in which three combustion heaters 110 are continuously installed may be used.

In addition, in the above-mentioned embodiment and variant, while the case in which the regulator 218 is a cover member configured to cover the second radiation surface 214a has been described, the regulator 218 is not limited to the cover member as long as the surface temperature of the baking object W is maintained at a central temperature of the baking object W or more and a heat transfer amount by the radiant heat from the surface of the baking object W to the second radiation surface 214a can be regulated.

In addition, in the above-mentioned first variant, the case in which the first radiation surface 120a and the second radiation surface 214a are parallel to each other and the shielding section 302 has the surface 302a perpendicular to both of the first radiation surface 120a and the second radiation surface 214a has been described. However, the first radiation surface 120a and the second radiation surface 214a may not be parallel to each other, and the shielding section 302 may have a surface that is not perpendicular to (parallel or inclined) at least one of the first radiation surface 120a and the second radiation surface 214a. Such deformation may also be applied to the shielding section 502 of the third variant.

In addition, in order to further enhance effects of the shielding sections 302 and 502 of the first and third variants, preferably, insulation of the shielding sections 302 and 502 (in particular, in a side facing the combustion heating system 100) may be increased or a radiation rate may be decreased.

In order to enhance the insulation of the shielding sections 302 and 502, use of steel panels or vacuum panels with an insulating material sandwiched therebetween or an insulation board such as a ceramic or the like is considered. In addition, in order to decrease the radiation rate of the shielding sections 302 and 502, when a glossy SUS plate is used or a higher temperature is used (for SUS, in the case of oxidation), a method of coating glass or a metal such as platinum or the like with low radiation is considered.

In addition, in the above-mentioned second variant, the case in which the adjoining two combustion heating systems 100 are inclined in a direction in which the first radiation surfaces 120a are opposite to each other, and the adjoining two cooling preheaters 214 are disposed to be inclined in a direction in which the second radiation surfaces 214a are opposite to each other has been described. However, the first radiation surface 120a and the second radiation surface 214a may be curved such that central sides in the conveyance direction are recessed.

INDUSTRIAL APPLICABILITY

The present disclosure may be used for the continuous heating furnace configured to combust a fuel and heat a baking object.

The invention claimed is:

1. A continuous heating furnace comprising:
a furnace main body;
a conveyance unit configured to convey a baking object in the furnace main body;
a plurality of heating sections heated by combustion, each having a first radiation surface configured to be heated by combustion and transfers radiant heat to the baking object conveyed by the conveyance unit, and arranged in a conveyance direction of the baking object in the furnace main body; and
at least one cooling preheater having a second radiation surface configured to receive radiant heat from the baking object when the second radiation surface is opposite to the baking object conveyed by the conveyance unit, and a gas flow path configured to preheat a gas used for combustion in the heating section by heat from the second radiation surface, the second radiation surface being an external surface of the at least one cooling preheater, the gas flow path being formed inside the at least one cooling preheater,
wherein the at least one cooling preheater is located between the plurality of heating sections, and the first radiation surface and the second radiation surface are disposed to adjoin in the conveyance direction of the baking object.

2. The continuous heating furnace according to claim 1, wherein the first radiation surface and the second radiation surface that adjoin each other are inclined with respect to the conveyance direction such that one end sides of the first radiation surface and the second radiation surface adjacent to each other of both ends in the conveyance direction are disposed closer to the conveyance unit than the other end sides.

3. The continuous heating furnace according to claim 2, further comprising a regulator configured to regulate a heat transfer amount by radiant heat from the surface of the baking object to the second radiation surface such that a surface temperature of the baking object is maintained at a central temperature of the baking object or more.

4. A continuous heating furnace comprising:
a furnace main body;
a conveyance unit configured to convey a baking object in the furnace main body;
a plurality of heating sections heated by combustion, each having a first radiation surface configured to be heated by combustion and transfers radiant heat to the baking object conveyed by the conveyance unit, and arranged in a conveyance direction of the baking object in the furnace main body; and
at least one cooling preheater having a second radiation surface configured to receive radiant heat from the baking object when the second radiation surface is opposite to the baking object conveyed by the conveyance unit, and a gas flow path configured to preheat a gas used for combustion in the heating section by heat from the second radiation surface,
wherein the first radiation surface and the second radiation surface are disposed to adjoin in the conveyance direction of the baking object, and further comprising shielding sections positioned between the first radiation surface and the second radiation surface in the conveyance direction, extending closer to the baking object than the first radiation surface and the second radiation surface in a direction perpendicular to the conveyance direction, and having surfaces perpendicular to or inclined with respect to at least one of the first radiation surface and the second radiation surface.

5. The continuous heating furnace according to claim 4, wherein the first radiation surface and the second radiation surface that adjoin each other are inclined with respect to the conveyance direction such that one end sides of the first radiation surface and the second radiation surface adjacent to each other of both ends in the conveyance direction are disposed closer to the conveyance unit than the other end sides.

6. The continuous heating furnace according to claim 5, further comprising a regulator configured to regulate a heat transfer amount by radiant heat from the surface of the baking object to the second radiation surface such that a surface temperature of the baking object is maintained at a central temperature of the baking object or more.

7. The continuous heating furnace according to claim 4, further comprising a regulator configured to regulate a heat transfer amount by radiant heat from the surface of the baking object to the second radiation surface such that a surface temperature of the baking object is maintained at a central temperature of the baking object or more.

8. A continuous heating furnace comprising:
a furnace main body;
a conveyance unit configured to convey a baking object in the furnace main body;
a plurality of heating sections heated by combustion, each having a first radiation surface configured to be heated by combustion and transfers radiant heat to the baking object conveyed by the conveyance unit, and arranged in a conveyance direction of the baking object in the furnace main body;
at least one cooling preheater having a second radiation surface configured to receive radiant heat from the baking object when the second radiation surface is opposite to the baking object conveyed by the conveyance unit, and a gas flow path configured to preheat a gas used for combustion in the heating section by heat from the second radiation surface, and
a regulator configured to regulate a heat transfer amount by radiant heat from the surface of the baking object to the second radiation surface such that a surface temperature of the baking object is maintained at a central temperature of the baking object or more.

\* \* \* \* \*